US011741779B2

(12) United States Patent
Hartstein et al.

(10) Patent No.: US 11,741,779 B2
(45) Date of Patent: Aug. 29, 2023

(54) SYSTEM AND METHOD FOR EXECUTING A REMOTE INTERACTIVE LIVE GAME

(71) Applicant: Playtech Software Limited, London (GB)

(72) Inventors: Ori Gal Hartstein, Tallinn (EE); Kevin Kilminster, Rayleigh (GB); Edo Haitin, Riga (LV)

(73) Assignee: PLAYTECH SOFTWARE LIMITED, London (GB)

( * ) Notice: Subject to any disclaimer, the term of this patent is extended or adjusted under 35 U.S.C. 154(b) by 0 days.

(21) Appl. No.: 17/104,885

(22) Filed: Nov. 25, 2020

(65) Prior Publication Data

US 2021/0158653 A1 May 27, 2021

Related U.S. Application Data

(60) Provisional application No. 62/940,936, filed on Nov. 27, 2019.

(51) Int. Cl.
*G07F 17/32* (2006.01)
*G07F 17/34* (2006.01)

(52) U.S. Cl.
CPC ...... *G07F 17/3227* (2013.01); *G07F 17/3211* (2013.01); *G07F 17/3267* (2013.01); *G07F 17/34* (2013.01)

(58) Field of Classification Search
CPC .. G07F 17/32; G07F 17/3211; G07F 17/3225; G07F 17/3227; G07F 17/3267; G07F 17/3269; G07F 17/34; A63F 13/30; A63F 13/35; A63F 13/53

See application file for complete search history.

(56) References Cited

U.S. PATENT DOCUMENTS

| 7,079,176 B1 | 7/2006 | Freeman | |
|---|---|---|---|
| 2002/0137562 A1* | 9/2002 | Malone | G07F 17/32 463/19 |
| 2003/0003997 A1* | 1/2003 | Vuong | G07F 17/3239 463/42 |

(Continued)

FOREIGN PATENT DOCUMENTS

| CA | 2425739 A1 | 5/1997 |
|---|---|---|
| EP | 3236437 A1 | 4/2017 |

*Primary Examiner* — Justin L Myhr
(74) *Attorney, Agent, or Firm* — Browdy and Neimark, P.L.L.C.

(57) ABSTRACT

The presently disclosed subject matter includes a system and a method for executing an interactive live game, wherein the system comprising: a game server configured to execute an interactive game including generating game events, to associate the game events with sync data and to transmit the game events and sync data to a player's device, at least one camera positioned in a live studio configured to capture a video of a live studio and to live stream the captured video; a game renderer configured to receive data indicative of the executed interactive game from the game server, to determine game display data; a video processor configured to receive the captured video, receive the game display data, and to create a live game video stream; thereby facilitating the player's device to create composited synchronous video comprising the live game video stream and data pertains to the game events.

26 Claims, 7 Drawing Sheets

(56) References Cited

U.S. PATENT DOCUMENTS

| | | | |
|---|---|---|---|
| 2004/0179554 A1* | 9/2004 | Tsao | H04N 7/173 375/E7.267 |
| 2010/0102511 A1* | 4/2010 | Tammesoo | G07F 17/3293 273/292 |
| 2010/0198992 A1 | 8/2010 | Morrison et al. | |
| 2010/0198998 A1 | 8/2010 | Hiramoto et al. | |
| 2013/0107786 A1 | 5/2013 | Lotfallha | |
| 2015/0126282 A1 | 5/2015 | Hitomi et al. | |
| 2016/0175695 A1* | 6/2016 | McKee | A63F 1/00 273/292 |
| 2016/0337433 A1* | 11/2016 | Elias | H04N 19/182 |

* cited by examiner

SYSTEM AND METHOD FOR EXECUTING A REMOTE INTERACTIVE LIVE GAME

CROSS-REFERENCES TO RELATED APPLICATIONS

The present application claims benefit from U.S. Patent Application No. 62/940,936 filed on Nov. 27, 2019, which is incorporated hereby by reference in their entirety.

TECHNICAL FIELD

The presently disclosed subject matter relates to computerized gaming systems and more particularly to executing an interactive game.

BACKGROUND

The gaming industry, and gambling industry in particular, has been enjoying ongoing growth. Casino games, in which a player can participate in a game with a dealer or with other players, enhances the player's experience. In order to enable players, who are unable, or do not wish to go to a real casino, the same experience and atmosphere that a real casino provides to the players, online casino games have been introduced. In such games, the player communicates with a gaming system which operates a casino game, where the game is accompanied with casino-like animation. With a further attempt to facilitate the live atmosphere of the game to the player, live games have been developed. In existing live casino games, a live dealer in a real casino operates a casino game through a physical casino device. A video of the casino, along with the dealer and the operated game, are communicated to a remote player. When the remote player wishes to join the game, he communicates with a gaming system, located at the physical casino, which creates a connection between the player and the dealer in the casino. The connection enables the player to join the game that is operated in the casino itself. However, in such live games, the game is operated in a physical manner in the casino, and the gaming system, which may be connected to the physical game, receives data on the outcome and operation of the physical game. In addition, the sensation and experience of the player in such live gaming systems is limited to watching a video of a casino game operated by a dealer, and to participate in a remote game which is recorded by video and is shown on the screen. Hence, it is required to create an interactive live game in which the player's sensation in participating in a live game is enhanced.

Alongside the above, Random Number Generation (RNG) based games, such as slot games, have historically been played by a single player against a slot machine. One of the main challenges is the connection of logic and math that are designed for a single player traditionally playing the RNG based game, into a gaming system that is large, distributed, and has multiple players participating in the same live version of the RNG based game, while keeping the authenticity of casino slots game. Hence, it is required to create a gaming system that enables to share the same game, with the same RNG math, between more than one player, in a scalable manner, and, optionally, to have a social RNG based gaming environment, in which players can be interactive with each other. Also, it is desired to enable an RNG based game between multiple players while considering the different jurisdictions and regulations.

General Description

According to one aspect of the presently disclosed subject matter there is provided a computerized method for executing an interactive live game, the method comprising, by a processor of a game server:

receiving from a player's device a request of a player to participate in an interactive live game;

repeatedly:

executing an interactive game, including generating game events;

based on the executed game, transmitting game display data to a video processor, wherein the transmitted game display data is used to create, by the video processor, together with a captured video of a live studio, a live game video stream, wherein the captured video includes video portions, each video portion being associated with a video timestamp;

associating the generated game events with sync data, giving rise to modified game events, and transmitting to the player's device the modified game events, thereby facilitating the player's device, after obtaining the live game video stream, to synchronize between a-synchronously received modified game events and the obtained live game video stream, based on the sync data in the modified game events and the video timestamps in the obtained video, and to create a composited synchronous video comprising the obtained live game video stream and data that pertains to the transmitted modified game events, the composited synchronous video constituting the interactive live game;

wherein at least some of the events are generated in response to receiving data indicative of a player's action in the executed interactive game.

In addition to the above features, the method according to this aspect of the presently disclosed subject matter can optionally comprise one or more of features (i) to (xv) below, in any technically possible combination or permutation:

i. wherein the method further comprising:

receiving from a plurality of players' devices requests of plurality of player to participate in the interactive live game; and transmitting to the plurality of players' devices the modified game events, thereby facilitating the players' devices to synchronize between the a-synchronously received modified game events and the obtained live game video stream, based on the sync data in the modified game events and the video timestamps in the obtained video, and to create the composited synchronous video.

ii. wherein at least some of the events are generated in response to receiving data indicative of the plurality of players' actions in the executed interactive game.

iii. wherein an operator is located in the live studio, the method further comprising:

receiving an input from an activation button operated by the operator; and in response to receiving the input, generating at least one game event.

iv. wherein associating the generated game events with sync data further comprises associating each generated game event with an event timestamp indicative of the time that the game event was generated.

v. wherein transmitting to the player's device the modified game events, includes selectively transmitting to a first player of the plurality of players at least some of the modified game events generated in response to receiving data indicative of the first player's actions in the executed interactive game.

vi. the method further comprising:

not transmitting the at least some of the modified game events to a second player of the plurality of players.

vii. wherein the composited synchronous video further includes an online chat, the online chat displaying chat inputs received from the plurality of players, the method further comprising:

receiving from the player's device chat input to be included in the online chat;

generating game events corresponding to the received chat input;

associating each of the corresponding game events with sync data, giving rise to corresponding modified game events; and transmitting to the player's device the corresponding modified game events.

viii. wherein at least one player's action requires a grant from a wallet application associated with the player in order to generate respective game events, the method further comprising:

in response to receiving data indicative of a player's action that requires the grant, transmitting a request for grant from the wallet application; and in response to receiving the grant from the wallet application, generating the respective game events.

ix. the method further comprising:

determining that a pre-defined time duration has passed from a time that the request for grant was transmitted without receiving the grant from the wallet application;

transmitting a cancellation of the request for the grant to the wallet application; and generating respective game events, different from the respective game events that are generated in response to receiving the grant.

x. the method further comprising:

in response to receiving data indicative of a player's action, determining a non-participating status in the executed interactive game;

sustaining generating game events corresponding to the player's action; and generating game events indicative of the non-participating status.

xi. wherein at least some of the events are generated in response to receiving data indicative of some of the players' actions, the method further comprising:

monitoring the players' actions;

receiving from a player's device a request of a player of the plurality of players to place a new bet;

calculating a total betting value based on the monitored player's actions;

in response to the betting value exceeding a threshold, rejecting the new request.

xii. the method further comprising:

receiving data indicative of disconnection of the player's device;

executing offline completion of the executed game, including communicating with a wallet application;

transmitting game events indicative of the offline completion to the player's device in response to receiving data indicative of re-connection of the player's device.

xiii. wherein the executed interactive game includes a plurality of rounds of single games, the method further comprising:

monitoring one or more gaming factors that pertain to execution of the game; and determining, in real time, a duration of at least one round of the plurality of rounds, based on the one or more monitored factors.

xiv. the method further comprising:

transmitting the game display data to a game renderer, located outside the live studio, thereby enabling the game renderer to create a video of the game and to transmit the video of the game to the video processor for creating the live game video stream.

xv. wherein the interactive game is an RNG based game.

According to another aspect of the presently disclosed subject matter there is provided a computerized method for executing an interactive live game, the method comprising:

receiving a selection of a player to participate in an interactive live game;

sending a request that pertains to the received selection; and repeatedly:

obtaining a live game video stream comprising a captured video of a live studio and game display data that pertains to execution of the selected interactive live game, wherein the captured video includes video portions, each video portion being associated with a video timestamp;

a-synchronously receiving modified game events generated in the executed interactive live game, the modified generated game events being associated with sync data;

synchronizing between a-synchronously received modified game events and the obtained live game video stream, based on the associated sync data in the received modified game events and the video timestamps in the obtained video, and creating a composited synchronous video comprising the obtained live game video stream and data that pertains to the received modified game events, wherein the composited synchronous video constitutes the interactive live game;

displaying the composited synchronous video, thereby enabling the player to participate in the interactive live game;

wherein at least some of the events are generated in response to receiving data indicative of a player's action in the executed interactive game.

In addition to the above features, the method according to this aspect of the presently disclosed subject matter can optionally comprise the following feature of the method further comprising:

receiving a player's action in the interactive live game;

in response to transmitting data indicative of the player's action, receiving a respective generated game event.

According to another aspect of the presently disclosed subject matter there is provided a game server for executing an interactive live game, by a processor and memory circuitry (PMC), the processor being configured to:

receive from a player's device a request of a player to participate in an interactive live game;

repeatedly:

execute an interactive game, including generating game events;

based on the executed game, transmit game display data to a video processor, wherein the transmitted game display data is used to create, by the video processor, together with a captured video of a live studio, a live game video stream, wherein the captured video includes video portions, each video portion being associated with a video timestamp;

associate the generated game events with sync data, giving rise to modified game events, and transmit to the player's device the modified game events, thereby facilitating the player's device, after obtaining the live game video stream, to synchronize between a-synchronously received modified game events and the obtained live game video stream, based on the sync data in the modified game events and the video timestamps in the obtained video, and to create a composited synchronous video comprising the obtained live game video stream and data that pertains to the transmitted modified game events, the composited synchronous video constituting the interactive live game;

wherein at least some of the events are generated in response to receiving data indicative of a player's action in the executed interactive game.

According to another aspect of the presently disclosed subject matter there is provided a gaming system for executing interactive live games, the gaming system, comprising:

a game server configured to execute an interactive game, which is configured to generate game events, and to associate the generated game events with sync data, giving rise to modified game events; wherein at least some of the events are generated in response to receiving data indicative of a player's action in the executed interactive game;

at least one camera positioned in a live studio configured to capture a video of a live studio and to live stream the captured video; wherein the captured video includes video portions, each video portion being associated with a video timestamp;

a game renderer configured to receive data indicative of the executed interactive game from the game server, to determine game display data and to transmit the determined game display data;

a video processor configured to receive the captured video from the at least one camera, receive the game display data from the game renderer, and to create a live game video stream;

wherein the game server is configured to receive, from a player's device, a request of a player to participate in the interactive game, and to transmit to the player's device modified game events generated in the executed game;

thereby facilitating the player's device, after obtaining from the video processor the live game video stream, to synchronize between a-synchronously received modified game events and the obtained live game video stream, based on the sync data in the modified game events and the video timestamps in the obtained video, and to create a composited synchronous video comprising the obtained live game video stream and data that pertains to the transmitted modified game events, wherein the composited synchronous video constitutes the interactive live game.

According to another aspect of the presently disclosed subject matter there is provided a computerized method for executing interactive games, the method comprising:

receiving requests of a plurality of players to participate in an interactive random number generator (RNG) based game; and repeatedly:

executing the interactive RNG, including generating game events; and transmitting data indicative of the executed game and the generated game events to the multiple players;

wherein at least some of the events are generated in response to receiving data indicative of the players' actions in the executed interactive game.

In addition to the above features, the method according to this aspect of the presently disclosed subject matter can optionally comprise the following feature of wherein the RNG based game is slots game.

The system and the non-transitory computer readable storage medium disclosed herein according to various aspects, can optionally further comprise one or more of features (i) to (xv) listed above, mutatis mutandis, in any technically possible combination or permutation.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "receiving", "sending", "executing" "processing", "transmitting", "associating", "monitoring", "creating", "obtaining", "comparing", "generating", "matching", "storing" "running", "executing", "implementing", "determining", "indicating", "synchronizing", "sustaining", "rejecting", "enabling", "calculating" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the live game server or the player's device disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes, or by a general-purpose computer specially configured for the desired purpose by a computer program stored in a non-transitory computer-readable storage medium.

With an attempt to facilitate the live atmosphere of the game to the player, and, optionally, to enable a player to participate in a game with other players playing the same game, the presently disclosed subject matter includes a gaming environment that enables a player to participate in a live interactive game including a live studio and an interactive game. In some examples, the interactive game includes a Random Number Generation (RNG) based game, where the RNG based math played in traditional physical machines, such as slot machines, are integrated and operated by a real-time based shared live game server. The RNG based game math, together with the visual presentation of the game are integrated, in a synchronized manner, in a live video stream from a live studio, such that the resulting video includes a display as if the RNG based game is being operated from the live studio. The remote player can participate in an interactive live game, in a smooth and synchronized manner.

Figure 1:
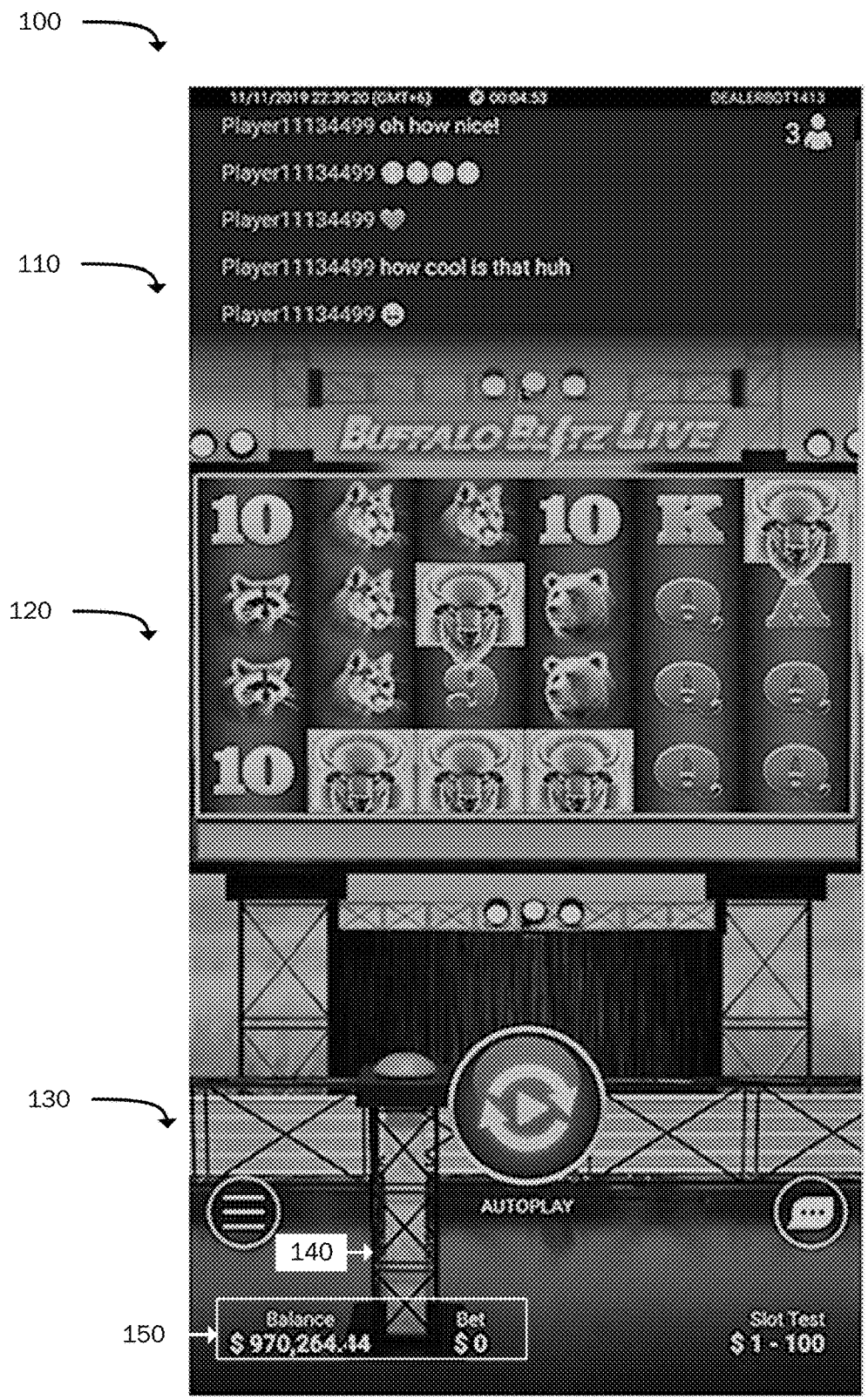
FIG. 1 illustrates one example of an optional screen shot of the gaming application, in accordance with certain embodiments of the presently disclosed subject matter.

Bearing this in mind, attention is drawn to FIG. 1 illustrating an example of a screen shot 100 of a gaming application, enabling a player to participate in an RNG based game, such as a slot machine. The screen shot 100 illustrates a display, as if the RNG based game is running in a live studio. As show in screen shot 100, the screen that is displayed to the player can be comprised of three separate areas of content, shown in an integrated and synchronized manner. One content area 130 may include a video of a live physical studio. The live studio can include an open square, such as a stage, occupied by a live operator, e.g. a game dealer (not shown). The live studio can also include a physical activation button 140 which may be operated by the live operator. Some information 150 relating to the game or information that pertains to the particular player may be displayed, as shown at the bottom of the screen. For example, the information includes the current balance of the player, or data that pertains to the player's actions or status in the game, e.g. if the player won a bet. In some examples, the information may include real time statistics, e.g. statistics for a slots dashboard. The screen in screen show 100 may also include a game content area 120, such as a slots game. The game content area 120 may be displayed as if running in the live studio. The game content area 120 may include a visual display of a slots game running in real time, and in which the player can participate. The screen shot 100 may also include a chat content area 110. If a player wishes to add comments, he can add them, and the comments may be displayed in the chat area 110. In cases where a plurality of players are participating in the game, the chat area 110 can display comments received from the plurality of players.

It should be noted that screen shot 100 is one example of displaying the content areas. Those skilled in the art will readily appreciate that the teachings of the presently disclosed subject matter are, likewise, applicable to other arrangements of content areas on the display screen.

For purpose of illustration only, the following description is provided for RNG based games, e.g. of slot games type. Those skilled in the art will readily appreciate that the teachings of the presently disclosed subject matter are, likewise, applicable to other RNG based games, such as roulette.

Figure 2:
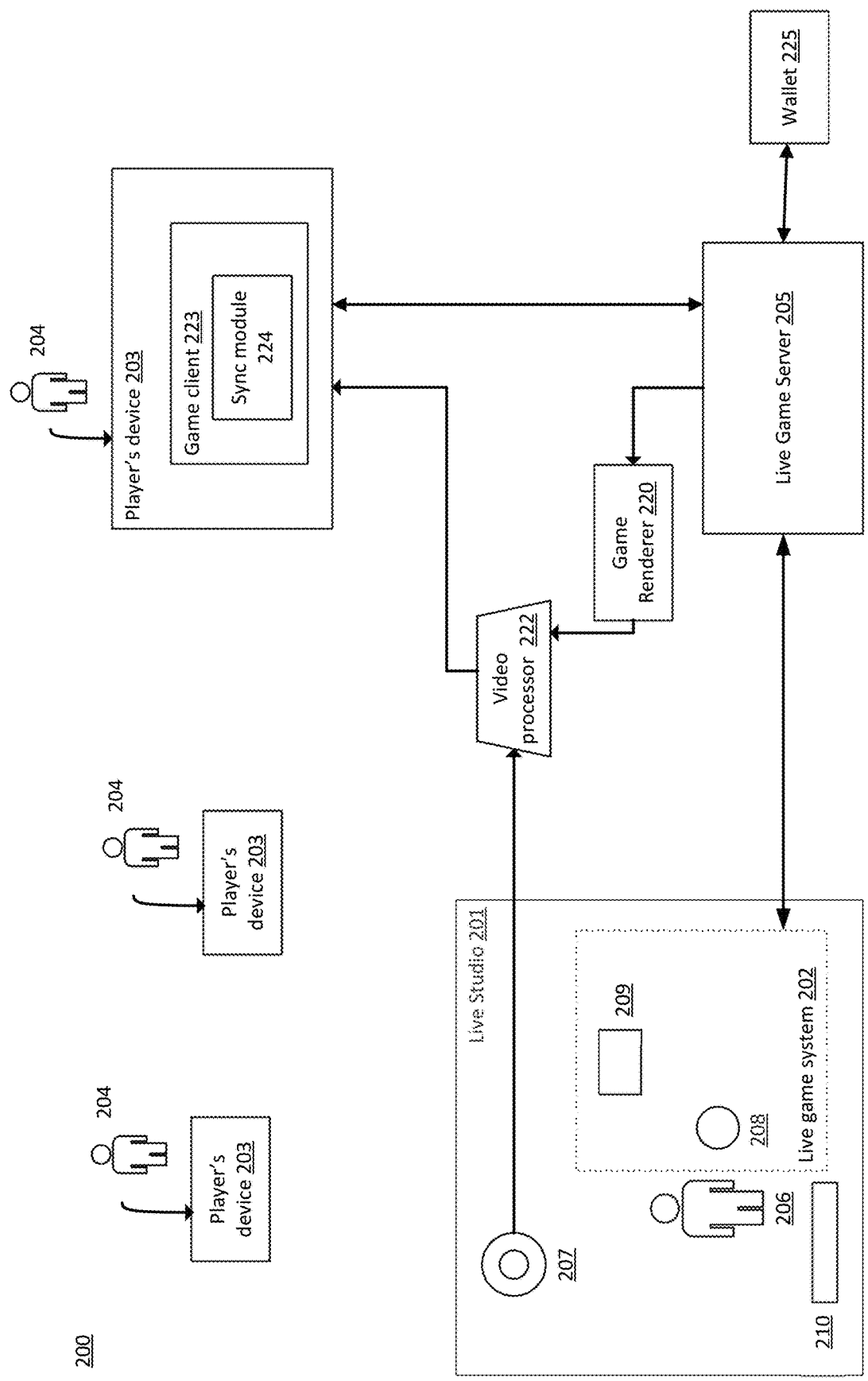
FIG. 2 shows a high-level illustration of a computerized gaming environment 200 in accordance with certain embodiments of the presently disclosed subject matter.

Bearing this in mind, attention is drawn to FIG. 2 illustrating a generalized diagram of a computerized gaming environment 200 in accordance with certain embodiments of the currently presented subject matter. Computerized gaming environment 200 is configured to enable a live version of an interactive game, such as an RNG based game. In some examples, the gaming environment 200 includes several entities, all operatively communicating via a network. The gaming environment 200 includes a live studio 201, which may be a physical studio operated and optionally occupied by an operator in real time. The live studio can include an open square area, such as a stage (not shown). The stage may include background surface 210. Background surface 210 may be used, as in known greenscreen technology, as an initial image for later compositing visual content on the background surface 210, such as display data of an executed game. In some examples, background surface 210 may include a screen on which the game display data is shown, e.g. reels of a slots game. A live operator 206 may be present in the live studio, and may verbally comment on the game's progress, or communicate with remote players who participate in the executed game, including making comments on e.g. a player who joined the game. The live studio 101 may also include a live game system 202 which includes an activation button 208 and screen 209. The activation button 208 may be operated by live operator 206, e.g. to initiate bonus rounds or perform a certain action of the game. The screen 209 may display to the live operator 206 data that pertains to the executed game or the players. For example, screen 209 can display to operator 206 a version of display of the game (e.g. the same executed game display that is shown to the players, or a subset of the display), information on the participating players or players' actions, etc. The live studio 201 may include at least one camera 207 which is configured to capture a video of the live studio 201. In some examples, the area that is captured by camera 207 includes the background surface 210, the live operator 206 and activation button 208. In some examples, the area captured by camera 207 can include screen 209. Camera 207 is configured to capture a video of the live studio 201 and to live stream the captured video, in real time, to a video processor 222, which may be located outside the live studio 201.

In some cases, gaming environment 200 includes a live game server 205. Live game server operatively communicates with live studio 101 and is configured to generate and execute interactive RNG based games, e.g. slot games, such as, but not limited to, Casino Buffalo Blitz™ Slots. Live Game Server 205 is configured to generate typical game functionality, such as typical slots functionality.

In some examples, gaming environment 200 further includes game renderer 220 and video processor 222. Game renderer 220 operatively communicates with both live game server 205 and video processor 222, and is configured to receive from live game server 205 executing the game, data indicative of the current executed game, and to determine the respective game display data that corresponds to the current executed game. For example, in a slots game, live game server 205 is configured to transmit to game renderer 220 data that pertains to current spin of reels, the next stop of the spinning, with the shape on the reels in the next stop, optionally, with the time that the reels should be stopped. Game renderer 220 is configured to receive the data and to determine game display data that corresponds to operation of the executed game, by determining the visual display of the reels, with the shape on the reels, when they stopped spinning. In some examples, game renderer 220 is configured to generate a respective game video based on the visual display data and to transmit game video to the video processor 222. In some examples, game renderer 220 is separated from game client 223 and is configured to operatively communicate with game client 223. Having game client 223 as a separate unit to game client 223 is advantages and facilitates sharing the interactive RNG based game between a plurality of players. While in known systems, a single player operates a gaming application on the player's device by game client 223, and the game client 223 includes a component that determines on the visual presentation of the game, according to the presently disclosed subject matter, operating the game renderer 220 outside gaming client 223 and sending a video including the visual display of the game to game client 223, enables the game renderer to share the same visual presentation of the game to more than one player's device.

In some examples, background surface 210 may include a screen on which the game display data is shown and game renderer 220 operatively communicates with background surface 210 and is configured to transmit a video of the game to the screen included in background surface 210, such that a video of the game is displayed on background surface 210 and is captured by camera 207. Alternatively, or additionally, game renderer 220 may be located outside the live studio 201. In some cases, game renderer 220 is configured to create a video of the game, and to transmit the video of the game including the game display data to video processor 222. Video processor 222 included in gaming environment 200 operatively communicates with live studio 201. In cases where live studio 201 includes background surface 210 of a green screen type or the like, video processor 222, is configured to receive the captured video from camera 207, receive the game display data, e.g. game video, from the game renderer 220, and to create, using known per se techniques, a live game video stream. The live game video stream can include a video including the captured video of the live studio in one content area (e.g. content area 130 in FIG. 1) and display of the executed game (e.g. game content area 120 of FIG. 1). In some examples, video processor 222 is configured to store the live game video stream in an accessible predefined database operatively communicating with video processor 222 (not shown).

In some cases, gaming environment 200 includes one or more players' devices 203 each operated by a player 204 for participating in a game. A player 204 can send a request through player's device 203 running a dedicated game application, to participate in the interactive live game. The request can be sent to live game server 205. Live game server 205 is configured to receive the request of the player 204 and to execute an interactive game. In some examples, live game server 205 is configured to constantly execute the interactive game, to receive the player's request, and to enable participation of the player 204 in the already executed interactive game. Constant execution of games may include slot games, in which the reels are spinning, irrespective of participation of a player in the game. The player 204 who joins the executed game may place a bet in the next round to start. In some examples, live game server 205 is configured to receive the player's request, and only then to start executing the interactive game. Starting execution of the interactive game only upon receipt of the player's request may be for example in a Blackjack game, where the game cannot be executed without a player. Once the request of the player 204 to participate in the executed interactive game is received at live game server 205, live game server 205 is configured to execute the game (if not constantly executing the game), and to generate game events. The generated game events pertain to the executed game and correspond in time to the live game video stream including the captured video from the live studio with the display game data. Some examples of game events include a start of a new round, result available, end of a round and errors. In some examples, at least some of the events correspond to a player's actions in a game and are generated in response to receiving data indicative of the player's 204 action in the executed interactive game. Some examples of events generated in response to receipt of data indicative of player's actions include receiving a new bet of player 204, auto-play started, win or loss of a player 204 in a game round.

Live game server 205 is configured to transmit the generated game events to the player's device 203. The generated game events can be used by player's device, e.g. by game client 223, to display information to the player.

In some examples, the game client 223 in player's device 203 is configured to obtain the live game video stream from the video processor 222 including the video of the live studio and the game display data, to receive the generated game events from the live game server 205, and to create a composited synchronous video comprising the obtained live game video stream, and data which pertains to the transmitted modified game events. The composited synchronous video constitutes the interactive live game, by which the player can participate in the game.

In some examples, obtaining the video from video processor 222 e.g. by downloading the video from an accessible predefined database operatively communicating with video processor 222 takes a certain time duration, e.g. a few seconds, whereas receiving the generated game events, which correspond in time from the live game server 205, takes only a few milli-seconds. Therefore, before creating the composited synchronous video, player's device 203 is configured to synchronize between the a-synchronously received game events and the obtained live game video stream. In some examples, in order to enable the player's device 203, e.g. using sync module 224, to synchronize between the a-synchronously received data (live game video stream and game events), both the live stream video as well as the generated game events may include sync data. The sync data facilitates the player's device 203 to synchronize between the a-synchronously received data, and only then to create the composited synchronous video. Further details on synchronizing between the received data is further explained below with respect to FIGS. 4 and 5.

In some cases, gaming environment 200 further includes wallet 225. Wallet 225 may include one or more e-Wallet applications associated with client 204, and enables the client to manage financial transactions relating to executed games, e.g. placing bets in a game. Wallet 225 operatively communicates with live game server 205, and, when necessary, live game server 205 is configured to communicate with wallet 225 to receive a grant for an action of the player, or to communicate data relating to financial transactions based on the player's activity in the executed game. In some cases, gaming environment 200 enables to complete one or more required E-Wallet transactions, in less than a predefined time, e.g. three seconds, from round start, where, in known systems similar transactions are accomplished only after a longer duration of time, e.g. 15 seconds. Further details with respect to completing wallet transactions in less than a predefined time are described below with respect to FIG. 4.

Figure 3:
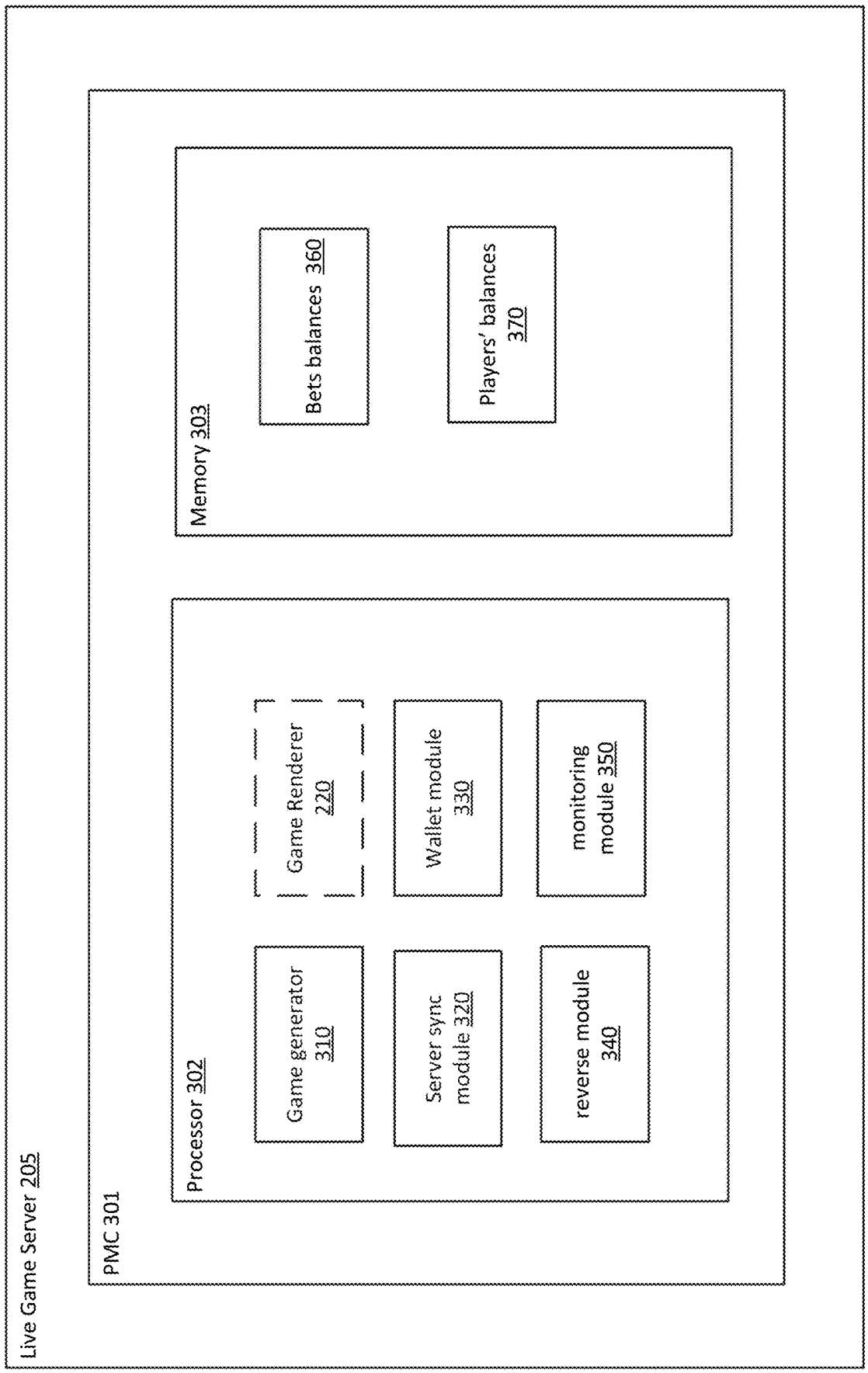
FIG. 3 illustrates a high-level functional block diagram of a live game server 205, in accordance with certain embodiments of the presently disclosed subject matter.

Reference is now made to FIG. 3 illustrating a functional block diagram of live game server 205. The illustrated live game server 205 includes a processor and memory circuitry (PMC) 301 comprising a processor 302 and a memory 303. The processor 302 is configured to execute several functional modules in accordance with computer-readable instructions implemented on a non-transitory computer-readable storage medium. Such functional modules are referred to hereinafter as comprised in the processor 302. The processor 302 can comprise game generator 310, server sync module 320, wallet module 330, reverse module 340 and monitoring module 350. In some examples, the processor 302 can further comprise game renderer 220 of FIG. 2.

In some examples, processor 302, e.g. using game generator 310, is configured to execute an interactive game, while generating typical game functionality and math, such as typical slots functionality. Executing the interactive game includes generating game events. Game generator 310 is further configured to receive player's request to participate in an interactive live game, and to generate at least some of the events in response to receiving data indicative of a player's action in the executed interactive game. Some examples of game events are listed above and are generated during execution of the game include a start of a new round, end of a round, while game events generated in response to receiving data indicative of a player's action in the executed interactive game include receiving a new bet of player 204, and winning or losing of a player 204 in the current round, based on player's bet and current status of the game.

In addition, based on the executed game, game generator may transmit to game renderer 220, data that pertains to execution of the game, such that game renderer 220 can determine the corresponding game display data to later transmit the determined game display data to video processor 222.

Processor 302 further includes server sync module 320 that is configured, prior to transmitting the generated game events to the player's device 203, to associate the generated game events with sync data. The generated game events with the associated with the sync data constitute modified game events. Only after associating the generated game event with the sync data, processor 302 transmits the modified game events to the player's device.

In some examples, live game server 205 is configured to operatively communicate with one or more e-Wallet applications 225 where financial transactions relating to the executed games are involved. In such cases, wallet module 330 included in processor 302 is configured to communicate data with wallet application 225 associated with a particular player participating in the interactive game.

PMC 301 further includes memory 303. Memory may store bets balance 360 and players balance 370. In some examples, bets placed by the players, and actions taken by the players, are monitored. Data which pertains to the monitoring of the bets and/or the players, may be stored in bets balance 360 and players balance 370. Further details with respect to such monitoring are provided with respect to FIG. 4.

It is noted that the teachings of the presently disclosed subject matter are not bound by the gaming environment described with reference to FIG. 2, or by the live game server 205 or player's device 203 described with reference to FIGS. 2 and 3. Equivalent and/or modified functionality can be consolidated or divided in another manner, and can be implemented in any appropriate combination of software with firmware and/or hardware and executed on a suitable device. For example, game renderer 220 can be comprised in live game server 205. The live game server 205 can constitute multiple live game servers operating in a shared manner in a live cluster of servers. Wallet application 225 can comprise a plurality of separate wallets (per each licensee of an interactive game) implemented on the same or on different servers; optionally, part of the functions of the separate wallets can be integrated in a centralized manner. Also, entities in gaming environment 200 may operatively communicate with each other via a network (not shown). Those skilled in the art will also readily appreciate that the data repositories/databases in memory 303 can be consolidated or divided in other manner; databases can be shared with other systems or be provided by other systems, including third party equipment.

Figure 4:
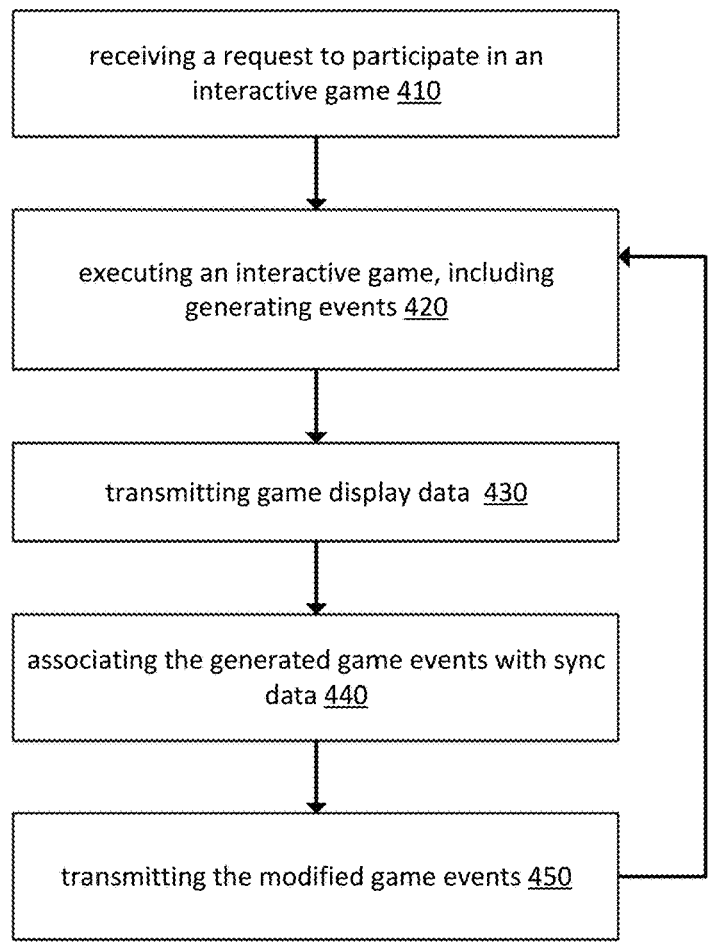
FIG. 4 illustrates a general flowchart of operations performed by the live game server, in accordance with certain embodiments of the presently disclosed subject matter.

Reference is now made to FIG. 4 illustrating a general flowchart of operations executed in live game server 205, in accordance with certain embodiments of the presently disclosed subject matter. In some examples, the operations can be performed by entities in the Live Game Server 205 illustrated with reference to FIG. 3.

In some cases, the process initiates, by the live game server 205, receiving a request of a player to participate in an interactive live game (block 410). In some examples, the request can follow a user selection received at a player's device to participate in an interactive live game from several available games, and sending, by the player's device to the live game server 205, a request including data on the selection. Once a request is received, live game server 205 using PMC 301 repeatedly performs several stages in order to execute the interactive game and enable the player to participate in the game.

Game generator 310 included in PMC 301 executes an interactive game including generating game events (block 420). In some examples, PMC 301 receives the player's request, and only then game generator 310 starts executing the interactive game. In some other examples, game generator 310 constantly executes the interactive game. While executing the interactive game, PMC 301 receives the player's request, and enables participation of the player 204 in the already executed interactive game. Constant execution of games may include slot games, in which the reels are spinning irrespective of participation of a player in the game. The player who joins the executed game may place a bet in the next round to start.

Execution of the game includes, among others, generating game events. In some examples, at least some of the events correspond to the player's actions in the game, and are generated in response to the player's actions. For example, game generator 310 receives data from player's device on a new bet placed by the player. In response to receiving that data, game generator 310 generates corresponding game events to the player placing a new bet.

The game executed by the game generator 310 includes operation of the game, including determining the game rounds starts and ends, operating RNG, and such. Visual presentation of the game corresponds to the game operation. Hence, based on the executed game, game generator 310 transmits game display data to a video processor (block 430), e.g. video processor 222. The game display data may include visual presentation of the game, based on the operation. For an ongoing executed game, the visual presentation changes together with the ongoing operation of the game. For example, for slot games, the visual presentation of the symbols on the reels should correspond to operation of the game. The game display data can include a video or an image with the reels with specific symbols displayed on the reels. In some examples, game generator 310 can send data which pertains to operation of the game to a game renderer 220. Game renderer 220 can determine the visual presentation of the game based on the operation, and then send a video including visual presentation the game to the video processor 222. As explained above, the video processor 222 receives a captured video of a live studio. The video includes video portions, each video portion being associated with a video timestamp. Together with the captured video, the video processor 222 uses the received game display data to create a live game video stream. The live game video stream, including the video portions with the video timestamps, is then sent by the video processor 222 to the player's device.

The game events generated by game generator 310 pertain to the executed game and correspond in time to the live game video stream including the captured video from the live studio with the display game data. The game events will eventually be sent to the player's device and will be combined together with the live game video stream into a composited synchronous video which will constitute the interactive live game for the player. However, the game events are sent to the player's device separately from the live game video stream, and, optionally, from a different location, and may therefore be received at the player's device at different times than the receipt time of the live game video. It is therefore required to synchronize between the a-synchronously received data.

In some examples, synchronization between the a-synchronously received data can be done using a global clock. Hence, after generating the game events, server sync module 320 included in PMC 301 associates the generated game events with sync data (block 440). The sync data may assist the player's device to synchronize the a-synchronously received game events with the live stream video received at a different, sometimes later, time. The generated game events associated with the sync data give rise to modified game events. In some examples, server sync module 320 uses a global clock and can determine the time at which the game events were generated. Hence, associating the generated game events with sync data comprises the server sync module 320 associating each generated game event with an event timestamp, where each event timestamp is indicative of the time that the game event was generated. In some cases, the modified game events, associated with sync data, are transmitted by PMC 301 to the player's device (block 450). In some examples, only a selected subset of game events are transmitted to the player's device. It should also be noted that associating the generated game events and transmitting the modified game events to the player's device should not be considered as limiting. Those skilled in the art will readily appreciate that the generated game events can be associated with sync data, but can be sent separately from the sync data to the player's device, and, yet, the player's device can create, based on the received generated game events and the received sync data, together with the live stream video, the composited synchronous video.

Once the player's device receives the modified game events and the live stream video, the player's device can synchronize between the a-synchronously received modified game events and the obtained live game video stream, based on the sync data associated with the generated game events. For example, the player's device can match between the modified game events with video portions having corresponding video timestamps. In some examples, corresponding timestamp is an event time stamp which is identical to a video timestamp. Alternatively, corresponding time stamps can be time stamps in which the time difference between the times indicated in the time stamps is not higher than a predefined minimal threshold.

Figure 5:
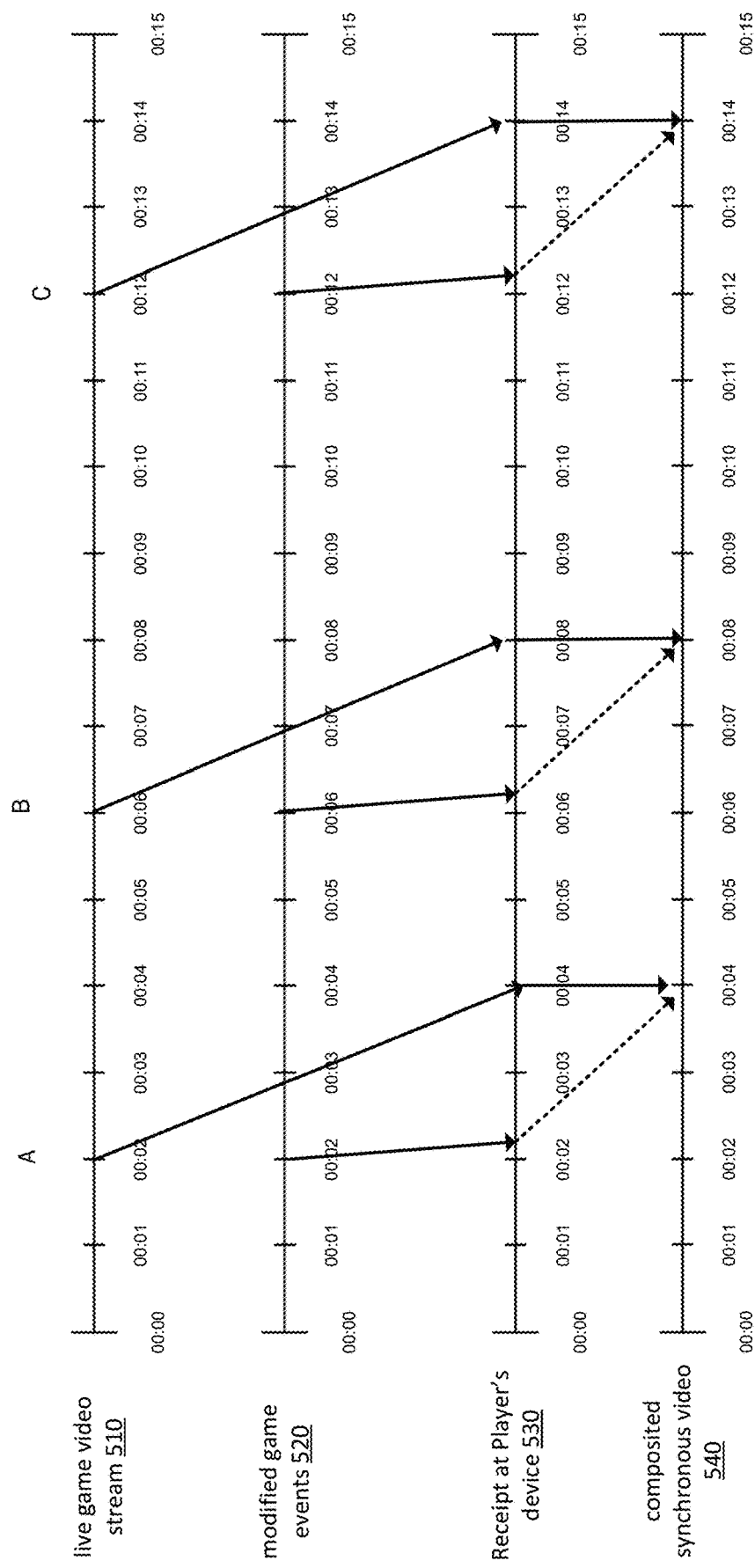
FIG. 5 illustrates examples of delays in data communications, in accordance with certain embodiments of the presently disclosed subject matter.

Reference is now made to FIG. 5 illustrating examples of delays in communication and the data received at the player's device, in accordance with certain embodiments of the presently disclosed subject matter.

In some examples, execution of the interactive game occurs in real time. Therefore, execution of the interactive game by live game server 205 occurs substantially simultaneously to the time during which the live studio operates, the time that the camera 207 captures the video of the live studio, and the time at which game display data should appear to the player. As such, game events generated by game generator 310 correspond in time to events occurring in the live studio, and to the captured video of the live studio. In addition, the generated game events correspond in time to the live game video stream, including the captured video from the live studio with the display game data, e.g. including display of the game execution. For example, a game event of a player winning a round, corresponds in time to a portion in the live game video stream which includes a display data of the end of the round with a line of reels indicative of a win for the player. In addition, the winning game event corresponds in time to the time at which the live operator in the live studio comments on the win of the round. The player's device 203 receives data from several sources, including at least receiving the generated game events from the live game server 205 and the live game video stream that it obtains from the video processor. Based on the received data, the player's device creates a composited synchronous video comprising the data. The composited synchronous video constitutes the interactive live game for the player. However, due to network routing speed limits and network constraints, the video is received by the player's device after a certain delay from the moment that it was requested, whereas game events sent from the live game server are received at the player's device much faster. Creating a composite video including the received data, without synchronizing between the received data, may result in a player who views content which does not match the video or display of the game. For example, without synchronizing between the received data, a player may be receiving a notification of a win, before the corresponding win display data is shown on the screen and while the game display still includes execution of the round. It is therefore advantageous to synchronize between the a-synchronously received data.

In order to facilitate the player's device 203 to synchronize between the a-synchronously received game events and the obtained live game video stream, server sync module 320 is configured, prior to transmitting the generated game events to the player's device 203, to associate the generated game events with sync data. The generated game events with the associated sync data constitute modified game events. Only after associating the generated game event with the sync data, processor 302 transmits the modified game events to the player's device.

In some examples, the captured video of the live studio may include video portions, where each video portion is associated with a video timestamp. For example, the video timestamps may be determined based on a global clock (or global time) using known per se techniques. The live game video stream comprised from the captured video and the game display data may also include the same portions of video with the same video timestamps of the captured video.

The live game server 205, which executes the game, may operate using the same global clock. Hence, the live game server 205 may associate each generated event with sync data. The sync data can include a timestamp based on the global clock in which the event was generated. The generated game events with the associated event timestamp constitute modified game events which are then sent to the player's device 203. Upon receipt of the modified game events, including the event timestamp for each generated game event, as well as receipt of the live game video stream including corresponding video time stamps, the player device 203 can synchronize between the modified generated game events and live game video stream, and create a composited synchronous video comprising the obtained live game video stream and data that pertains to the transmitted modified game events. For example, with reference to FIG. 1, the composited synchronous video can include the screen shot 100 with the obtained live game video stream shown by content areas 120 and 130 and with the data that pertains to the transmitted modified game events as shown by content display 150. The composited synchronous video may constitute the interactive live game in which the player may participate.

FIG. 5 shows live game video stream 510. While the video is substantially constantly being transmitted to the player's device, three video portions are marked by A, B and C. As shown, video portion A, although occurred at time 00:02, the video portion will be received by player's device 530 only at time 00:04, indicating a delay of 2 seconds. On the other hand, game events generated in the live game server 205 at the same time as the time of video portion A, will be received, after being associated with sync data, by the player's device 530 shortly after their creation, well before arrival of the video portion A. As such, the player's device will synchronize between the two, based on the sync data associated in the modified generated games. Composite synchronous video 540 indicates when each received data will be included in the composite synchronous video. As shown, after synchronization, the modified game events will be added to the composite video only at time 00:04, when the live video stream is also received. A similar process occurs with video portions B and C, in which the game events generated in a corresponding time to video portions B and C respectively, will be synchronized with video portions B and C in a live video stream, and will be added to the composited synchronous video, not at the time of their arrival, but later, to be synced with the time that the video portions are received at the player's device.

Synchronizing between a-synchronously received data from several sources is advantageous and assists in creating a coherent game video, providing synchronized content to a player.

Referring back to FIG. 4, after synchronizing the received data, the player's device can create a composited synchronous video comprising the obtained live game video stream and data that pertains to the transmitted modified game event. The composited synchronous video constitutes the interactive live game.

In some examples, a live operator is located in the live studio 201. The live operator, such as operator 206 in FIG. 2, can receive data that pertains to the executed game or the players, e.g. by screen 209. For example, screen 209 can display to operator 206 a version of display of the game (e.g. the same executed game display that is shown to the players, or a subset of the display), information on the participating players or players' actions, etc. In some examples, the live studio 201 also includes activation button 208. The live operator 206 can initiate bonus rounds or a certain action of the game using the activation button. In response, the live game server 205, e.g. using game generator 310, can receive an input from the activation button operated by the operator, and, in response, may generate at least one game event. For example, the live operator 206 can press an activation button of a buzzer type and initiate a slots round. The game generator 310 receives the initiation and generates a game event corresponding to initiation of a round. The game event, after being associated with sync data, is transmitted to the player's device.

In some examples, live game server 205 operates an auto-play function, in which a player places bets for the next predefined number of rounds. Placing bets for next rounds in advance is advantageous when multiple players are sharing the same RNG based games, as it enables the live game server 205 to execute fast consecutive rounds, without any delay in waiting for players to place bet before the next round, as in traditional games.

One technical advantage of the gaming environment 200, including the live game server 205 executing the interactive game separately from the live studio, is that the gaming environment supports live, real time multiple players gaming, while sharing the same game, with the same RNG math, simultaneously, in a live real-time manner, that is scalable. Therefore, in some examples, live game server 205 receives, from a plurality of players' devices, requests from a plurality of players to participate in the interactive live game. The plurality of players' devices can obtain the video game stream. After receiving the requests, the game live server 205 can transmit, to the plurality of players' devices, modified game events, including game events generated while executing the interactive game associated with sync data, to facilitate the plurality of player's devices to synchronize between the a-synchronously received modified game events and the obtained live game video stream, based on the sync data in the modified game events and the video timestamps in the obtained video. The players' devices can then create the composited synchronous video. The display of the composited synchronous video to the plurality of players, at substantially the same time, enables the plurality of players to participate in the same live RNG based game. In some examples, the game renderer 220, located outside the player's device 203 and game client 223 facilitates sharing the same visual presentation of the executed game to the multiple players. In some examples, at least some of the game events are generated in response to receiving data indicative of the plurality of players' actions in the executed interactive game. Hence, the plurality of players can participate in the interactive game and e.g. place bets in the game.

Since each player may operate from a different physical jurisdiction having different regulations for operating games, live game server may include more than one version of the executed game, where each version may be associated with a live studio 201. For example, players from a certain jurisdiction may not be able to operate the auto-play function. Hence, live game server 205 operates, in addition, a non auto-play version of the interactive game. In some examples, after receiving the requests to participate in the interactive live game, live game server 205 may determine for each player, which version of the game should be operated to him, and accordingly, execute the determined version for that player.

In cases where a plurality of players are participating in the game, while some of the generated game events may be sent to all players, it may be advantageous to send data that pertains to a player's action in the game only to that player, and not send the data to other players. Hence, in some examples, transmitting to the player's device the modified game events, includes selectively transmitting to a certain first player of the plurality of players at least some of the modified game events generated in response to receiving data indicative of the first player's actions in the executed interactive game. Additionally, transmitting to the player's device includes not transmitting at least some of the modified game events to a different, second player of the plurality of players.

The interactive game may implement a chat area in which the multiple players can add comments. The player's comments can be received by the PMC 301, and can be processed in a similar manner to that being handled with respect to game events. In order to implement an online chat, the composited synchronous video can further include an online chat content area. The online chat content area displays chat inputs received from the plurality of players. The PMC 301 can receive from a player's device chat input to be included in the online chat. Game generator 310 generates game events corresponding to the received chat input, and associates each of the corresponding game events with sync data. The associated generated game events give rise to corresponding modified game events. The modified game events can then be transmitted to the player's device. In cases where a plurality of inputs are received from a plurality of players, PMC 301 can receive the plurality of inputs, game generator 310 can generate corresponding game events, and the game events, together with sync data, can be transmitted to the players' devices. The online chat can then include comments from a plurality of players in a synchronized manner to the video game stream.

In addition, PMC 301 can provide real-time statistics for an RNG based game, such as a slots dashboard, such that they are displayed in the composited synchronous video. The statistics can be provided e.g. using Kafka streaming to achieve low latency real time calculations of statistics on round results. The real time statistics may include periodic statistics relating to the game. In order to generate real-time statistics, game generator 310 may process the player's actions and generate game events, in real-time, and derive information on status and behaviour of the executed game and active players. The derived information can be sent, together with sync data that pertains to the time that the information was derived, to the player's device, and can be included in the composite synchronous video.

As illustrated in FIG. 2, gaming environment 200 may include wallet 225 including one or more wallet applications operatively communicating with live game server 205. Some of the player's actions in a game involve financial transactions, such as placing a bet by the player, winning in a game round, or leaving a game session when the player has a positive balance in the game, etc. In order to perform a financial truncation, in some examples, in response to receiving data indicative of a player's action that requires the grant, wallet module 301 in PMC 301 may communicate with wallet 225 associated with the player, and may transmit a request for a grant. If the wallet application approves the transaction and sends a grant approval to the wallet module 301, game generator 310, in response, may generate game events that correspond to grant of the wallet application, the player's action that involves the transaction, etc.

As gaming environment 200 enables participating in a live version of an interactive game, there is an advantage in continuing the ongoing execution of the game, despite any routing or network constraints or delays. For example, such a delay may occur when a player is disconnected during execution of a game, or if communication with the wallet application is slow and is being delayed. Therefore, in some examples, gaming live game server 205, using reverse module 340, may implement short period transactions and reverse action procedures. According to the procedures, time duration of the traffic and communications with entities in the gaming environment such as the player's device and wallet 225, are monitored. In case reverse module 340 determines that a pre-defined time duration has passed from a time that a certain communication was sent to an entity in gaming environment 200, without receiving a response, in some examples, reverse module 340 may execute a reverse action procedure, including performing one or more of the following actions: cancel the last action of the player, reject participating of player in the next game round, cancel a request for a grant that was sent to wallet 225, etc. For example, wallet module 301 may determine that predefined types of requests, such as requests for a grant, should be completed within 3 seconds, whereas in known systems, similar transactions are accomplished only after a longer duration of time, e.g. 15 seconds. Hence, reverse module 340 may monitor, using monitoring module 350, the time duration that has passed from a time that the request for a grant was transmitted to wallet 225. Monitoring module 350 may determine that a pre-defined time duration has passed from a time that the request for a grant was transmitted to wallet 225 without receiving a grant from the wallet application. By executing such a reverse action procedure, reverse module 340 may transmit, using wallet module 330, to wallet 225 a cancellation of the request for a grant. In addition, reverse module 340 may transmit to game generator a request to generate respective game events, corresponding to the reverse actions which are different from the respective game events that are generated in response to receiving the grant.

In some examples, irrespective of network constraints and delays, PMC 301 may determine that certain actions cannot be performed if certain conditions are not met. For example, during a game round, players cannot place new bets. Also, while implementing round max win exposure capping, if bets placed by players in the gaming system in current time exceed a certain threshold, or if the total number of players currently participating in the interactive game exceeds a certain threshold, new bets cannot be received. Therefore, in some examples, game generator 310 may receive data indicative of a player's action, and, in response, may determine a non-participating status in the executed interactive game. For example, a non-participating status may be determined when the game has already initiated a new round. Game generator 310 can therefore sustain generating game events corresponding to the player's action, and, optionally, can generate game events indicative of the non-participating status. The generated game events, with sync data, are transmitted to the player's device, such that the player is aware of the non-participating status.

In some examples, in order to implement the round max win exposure capping, distributed players' counters act on two levels—operator level and global level. Counting the number of active players in an operator level may include monitoring the number of players currently participating in the interactive game in each live game server 205, in case live game server 205 implements a cluster of servers. Counting the number of active players in a global level includes monitoring the number of players currently participating in the interactive game in all live game servers 205. Data that pertains to monitoring and counting the number of active players can be stored, e.g. in players' balances 370 in memory 303. In case the number of active players in each level exceeds a predefined threshold, game generator 310 may reject new players from joining the interactive game, and/or participating in the current round.

In order to monitor and cap the round max win exposure, in some examples, PMC 301, using monitoring module 350, may monitor the players' actions in the interactive game. For example, the number of new requests to participate in the interactive game that are received by game generator 310 may be monitored. The number of players participating in each game can also be monitored. Also, the total bets value placed by the players for the next round may be monitored. Monitoring module 350 may track and store the monitored actions in players' balances 370 comprising one or more balances according to the parameter that is monitored. In some cases, upon receiving by game generator 310 from a player's device, a request of a player of the plurality of active players to place a new bet, monitoring module 350 may calculate a total betting value based on the monitored players' actions. For example, monitoring module 350 may sum all the bets placed by the players for the next round. In cases where the calculated total betting value exceeds a threshold, game generator 310 may reject the new request to place bets. Optionally, reverse module 340 may also execute a reverse procedure by transmitting to wallet 225, using wallet module 330, a request to cancel a request for a grant, if such a request has already been transmitted. Those skilled in the art will readily appreciate that the above includes a limited number of examples, and that the teachings of the presently disclosed subject matter are, likewise, applicable to additional scenarios in the gaming environment 200 where player's actions are rejected and reverse procedures are optionally executed.

Implementing reverse action procedures may be advantageous in cases where the gaming environment 200 includes a large number of game servers 205 operating in a cluster of servers, multiple players 204 operating multiple players' devices 203 participating in the same interactive game, and a large number of external e-wallet applications 225, associated with the players. In such cases, the ongoing execution of the interactive game should not be interfered with, due to network constrains and delays involved in communicating with a large number of external wallet applications, e.g. for receiving approval on grant requests for perfuming transactions pertains to the player's actions in the game. Also, monitoring and capping the round max win exposure is advantageous, for example in real-time versions of the interactive game, where monitoring of all players is required in a short time to ensure the ongoing execution of the game. In addition, applying exposure limits may be critical to gaming systems, and executing procedures that enable capping the exposure limits are advantageous.

In some cases, PMC 301 may perform offline completion of free-games for the players, e.g. when players are disconnected from the game. PMC 301 may run offline calculations which pertain to the executed game, in order to complete the disconnected player free-games in background, and to provide the player, when re-connected with a calculated summary of all games played. In some examples, completing the offline completion of free-games involves communicating with wallet 225 in real-time, and generating game events including summary records pertains to the executed game for a player's future review. Hence, in some examples, game generator 310 may receive data indicative of disconnection of the player's device. In response, game generator may execute offline completion of the executed game, including communicating with a wallet application, if necessary, and transmit game events indicative of the offline completion to the player's device in response to receiving data indicative of re-connection of the player's device. Implementing offline completion of free-games is advantageous as it assists in enabling the ongoing execution of the interactive game in the time constraints placed by live game server 205 (e.g. completing transactions in a short time period).

In some examples, game generator 310 can implement real-time calculation of rounds duration, e.g. based on game execution and results, and create a dynamic round duration. In such examples, each round may have different time duration. The dynamic round may be determined by game generator 310 generating game events. In some examples, game generator 310 determines the game round based on the game logic/math. One or more factors pertaining to the execution of the game may be considered when determining the round duration, including, but not limited to: where the round is a winning round, chances of executing "free-games" bonus or chances of having the reels show "special" results. For example, after monitoring higher chances of executing "free-games" bonus or higher chances of having the reels show "special" results, game generator 310 may determine, in real-time, a longer duration of at least one round of the plurality of rounds. The determined duration may be shared among all live game servers 205 in the live cluster. In some examples, once a dynamic round duration is determined, data on the round duration is sent by live game servers 205 to screen 209 in live studio 201, such that the operator may receive indication of the round duration and act accordingly, such that the live video captured by the live studio correspond the execution of the game with the dynamic round duration.

Figure 6:
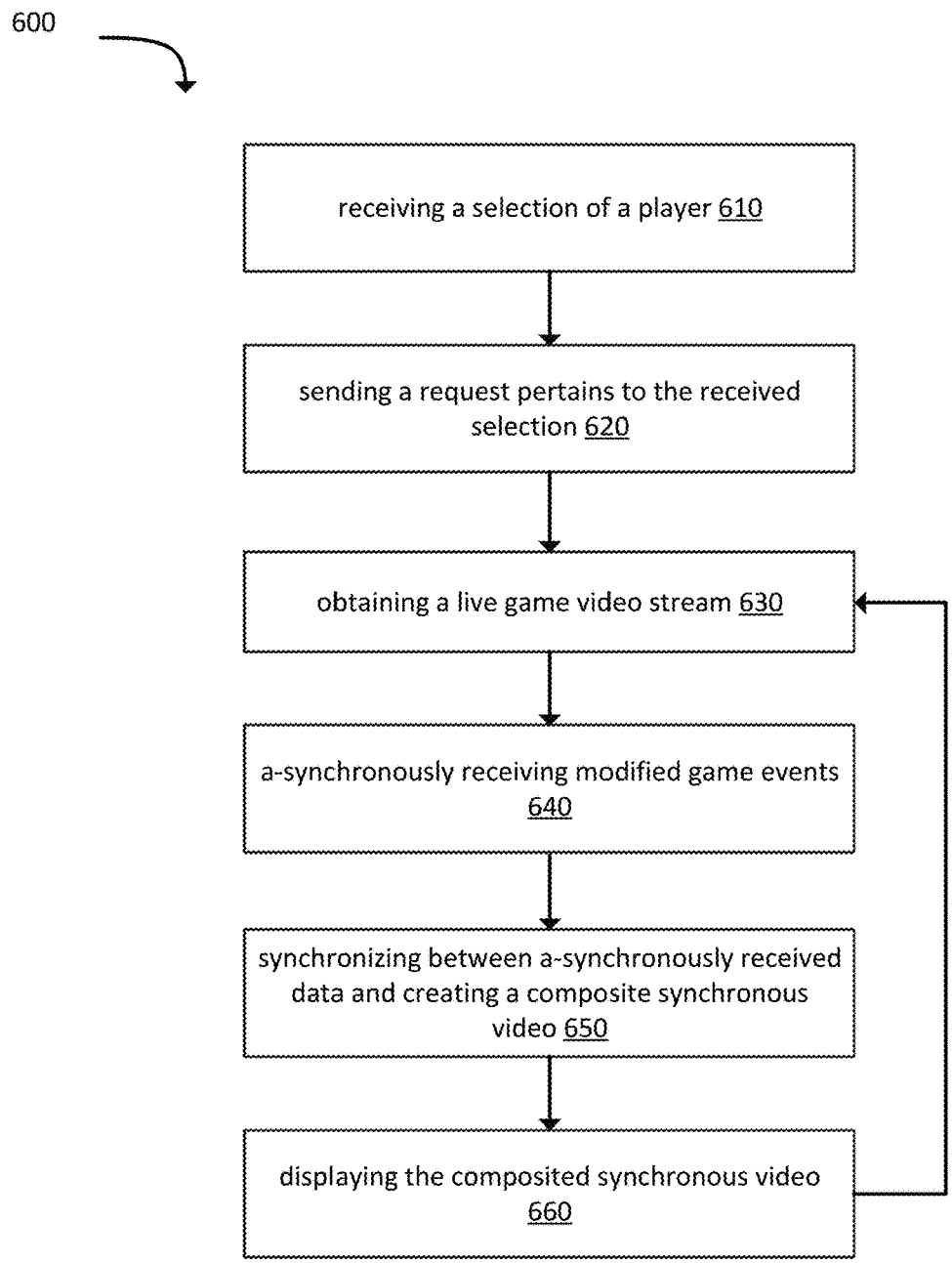
FIG. 6 illustrates a general flowchart of operations performed by an application running on player's device, in accordance with certain embodiments of the presently disclosed subject matter.

Reference is now made to FIG. 6 illustrating a generalized flowchart of operations performed on an application running on a player's device, in accordance with certain embodiments of the presently disclosed subject matter.

In some cases, process initiates by the player's device, such as player's device 203, receiving a selection of a player operating the device to participate in an interactive live game (block 610). The player's device 203 may send a request that pertains to the received selection, to live game server 205.

Once the request is sent, player's device 203 may repeatedly perform several stages in order to execute the interactive game and enable the player to participate in the game. In some cases, player's device 203 obtains a live game video stream comprising a captured video of a live studio and game display data that pertains to execution of the selected interactive live game (block 630). In some examples, player's device 203 can obtain the live game video stream by requesting from an accessible predefined database to download the live game video stream. In response, the live game video stream is received at the player's device. The captured video in the live game video stream includes video portions, where each video portion is associated with a video timestamp.

In addition to receiving the live game video stream, the player's device receives modified game events generated in the executed interactive live game (block 640). The received game events pertain to the executed game selected by the user, and correspond in time to the live game video stream obtained by the player's device. However, the game events are received in an a-synchronous manner with respect to the live game video stream. In some examples, while game events are received shortly after they are generated, and sent from the live game server 205, the live game video stream is usually received with a delay, due to routing and network constrains. Hence, synchronizing between the received data, before displaying them to the user, is required. In order to sync between the received data, the received game events are associated with sync data, giving rise to modified events. Those skilled in the art will readily appreciate that the generated game events can be associated with sync data, but can be received separately from the sync data at the player's device. Yet, the sync data can be used for the synchronization.

The player's device can synchronize between the a-synchronously received modified game events and the obtained live game video stream, based on the associated sync data in the received modified game events and the video timestamps in the obtained video, and creates a composited synchronous video comprising the obtained live game video stream and data that pertains to the received modified game events (block 650). In some examples, the sync data associated with each game event includes an event timestamp indicative of the time that the game event was generated in live game server 205. Synchronizing between the received data can be done based on the event time stamps associated with each game event. For example, the player's device 203, using sync module 224, can match between the modified game events with video portions having corresponding timestamps. In some examples, corresponding timestamps is an event timestamp which is identical to a video timestamp. Alternatively, corresponding timestamps can be timestamps in which the time difference between the times indicated in the timestamps is not higher than a predefined minimal threshold.

After synchronization, player's device 203 can create the composite synchronous video, wherein the composited synchronous video constitutes the interactive live game.

Player's device 203 can display the composited synchronous video to the player, thereby enabling the player to participate in the interactive live game (block 660). In some examples, player's device can receive one or more player's actions in the executed game, and transmit data indicative of the player's action to live game server 205. During execution, at least some of game events are generated in response to receiving data indicative of a player's action in the executed interactive game.

Alongside the above, RNG based games, such as slot games, have historically been played by a single player against a slot machine. One of the main challenges is the connection of logic and math that are designed for a single player traditionally playing an RNG based game, into a gaming system that is large, distributed, and has multiple players participating in the same live version of the RNG based game. The gaming environment illustrated in FIG. 2, in which the RNG math and logic have been transmitted to the live game server, instead of operating on a physical slot machine, enables to share the same interactive game, with the same RNG math, between more than one player, and, optionally, to enable a social RNG based gaming environment, in which players can be interactive with each other.

Figure 7:
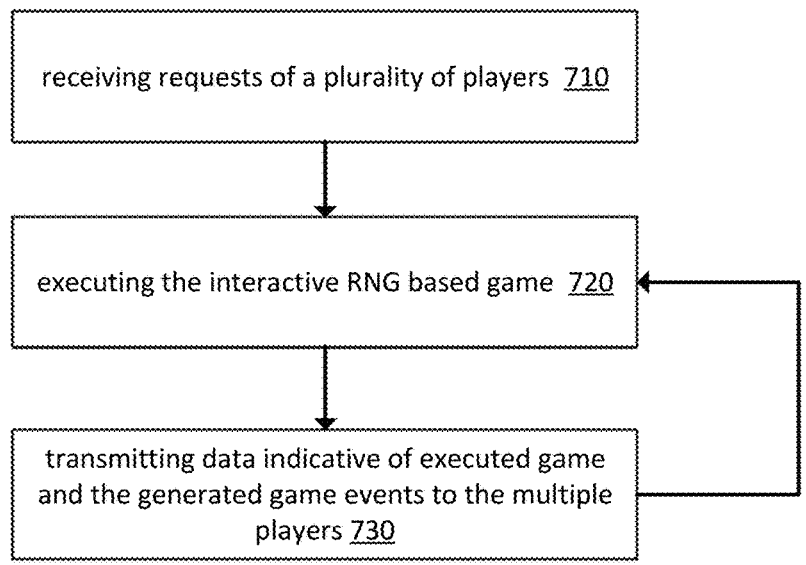
FIG. 7 illustrates a generalized flowchart of optional operations performed by the live game server, in accordance with certain embodiments of the presently disclosed subject matter.

Reference is now made to FIG. 7 illustrating a generalized flowchart of optional operations performed by the live game server, in accordance with certain embodiments of the presently disclosed subject matter.

Process initiates, at live game server, such as live game server in FIG. 2, receiving a request of a plurality of players to participate in an interactive Random Number Generator (RNG) based game (block 710). The request can be received from players' devices associated with the players, such as player's device 203.

Once a request is received, live game server 205, using PMC 301, repeatedly performs several stages in order to execute the interactive game and enable the player to participate in the game.

Game generator 310 included in PMC 301 executes an RNG based game including generating game events (block 720). The process can be performed in a similar manner to that described above with respect to block 420.

Based on the executed game, PMC 301 transmits data indicative of executed game and the generated game events to the multiple players (block 730), in a similar manner to that described with respect to block 430. At least some game events are generated in response to receiving data indicative of the players' actions in the executed interactive game.

It is noted that the teachings of the presently disclosed subject matter are not bound by the flow charts illustrated in FIGS. 4, 6 and 7, and that the illustrated operations can occur out of the illustrated order. For example, operations 430, and 440, shown in succession, can be executed substantially concurrently, or in the reverse order. It is also noted that whilst the flow chart is described with reference to elements of gaming environment 200, this is by no means binding, and the operations can be performed by elements other than those described herein.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A computerized method for facilitating a player's device to execute an interactive live game, the method comprising, by a processor of a game server:
receiving from the player's device a request of a player to participate in an interactive live game;
repeatedly:
executing an interactive game, including generating game events;
based on the executed game, transmitting game display data to a video processor, wherein the transmitted game display data is used to create, by the video processor, together with a captured video of a live studio, a live game video stream, wherein the captured video includes video portions, each video portion being associated with a video timestamp;
associating the generated game events with sync data comprising event timestamps indicative of the time that a game event of the games events was generated, giving rise to modified game events, and transmitting to the player's device the modified game events, thereby facilitating the player's device, after obtaining the live game video stream, to synchronize between the obtained video stream and the modified game events, separately and a-synchronously received from a source of information other than the video processor, based on the sync data in the modified game events and the video timestamps in the obtained video stream, and to create a composited synchronous video comprising the obtained live game video stream and data that pertains to the transmitted modified game events, the composited synchronous video constituting the interactive live game;

wherein at least some of the events are generated in response to receiving data indicative of a player's action in the executed interactive game.

2. The computerized method of claim 1, the method further comprising:

receiving from a plurality of players' devices requests of plurality of players to participate in the interactive live game; and transmitting to the plurality of players' devices the modified game events, thereby facilitating the players' devices to synchronize between the a-synchronously received modified game events and the obtained live game video stream, based on the sync data in the modified game events and the video timestamps in the obtained video, and to create the composited synchronous video.

3. The computerized method of claim 2, wherein at least some of the events are generated in response to receiving data indicative of the plurality of players' actions in the executed interactive game.

4. The computerized method of claim 3, wherein transmitting to the player's device the modified game events, includes selectively transmitting to a first player of the plurality of players at least some of the modified game events generated in response to receiving data indicative of the first player's actions in the executed interactive game.

5. The computerized method of claim 4, the method further comprising:

not transmitting the at least some of the modified game events to a different, second player of the plurality of players.

6. The computerized method of claim 3, wherein at least some of the events are generated in response to receiving data indicative of some of the players' actions, the method further comprising:

monitoring the players' actions;

receiving from a player's device a request of a player of the plurality of players to place a new bet;

calculating a total betting value based on the monitored player's actions;

in response to the betting value exceeding a threshold, rejecting the new request.

7. The computerized method of claim 2, wherein the composited synchronous video further includes an online chat, the online chat displaying chat inputs received from the plurality of players, the method further comprising:

receiving from the player's device chat input to be included in the online chat;

generating game events corresponding to the received chat input;

associating each of the corresponding game events with sync data, giving rise to corresponding modified game events; and transmitting to the player's device the corresponding modified game events.

8. The computerized method of claim 1, wherein an operator is located in the live studio, the method further comprising:

receiving an input from an activation button operated in the live studio by the operator; and in response to receiving the input, generating at least one game event.

9. The computerized method of claim 1, wherein at least one player's action requires a grant from a wallet application associated with the player in order to generate respective game events, the method further comprising:

in response to receiving data indicative of a player's action that requires the grant, transmitting a request for grant from the wallet application; and in response to receiving the grant from the wallet application, generating the respective game events.

10. The computerized method of claim 9, the method further comprising:

determining that a pre-defined time duration has passed from a time that the request for grant was transmitted without receiving the grant from the wallet application;

transmitting a cancellation of the request for the grant to the wallet application; and generating respective game events, different from the respective game events that are generated in response to receiving the grant.

11. The computerized method of claim 1, the method further comprising:

in response to receiving data indicative of a player's action, determining a non-participating status in the executed interactive game;

sustaining generating game events corresponding to the player's action; and generating game events indicative of the non-participating status.

12. The computerized method of claim 1, the method further comprising:

receiving data indicative of disconnection of the player's device;

executing offline completion of the executed game, including communicating with a wallet application;

transmitting game events indicative of the offline completion to the player's device in response to receiving data indicative of re-connection of the player's device.

13. The computerized method of claim 1, wherein the executed interactive game includes a plurality of rounds of single games, the method further comprising:

monitoring one or more gaming factors that pertain to execution of the game; and determining, in real time, a duration of at least one round of the plurality of rounds, based on the one or more monitored factors.

14. The method of claim 1, the method further comprising:

transmitting the game display data to a game renderer, located outside the live studio, thereby enabling the game renderer to create a video of the game and to transmit the video of the game to the video processor for creating the live game video stream.

15. The method of claim 1, wherein the interactive game is an RNG based game.

16. A game server for facilitating a player's device to execute an interactive live game, the game server comprising a processing circuitry comprising at least one processor and computer memory, the processing circuitry being configured to execute a method as defined in claim 1.

17. A non-transitory computer readable storage medium tangibly embodying a program of instructions that, when executed by a computer, cause the computer to perform a method for facilitating a player's device to execute an interactive live game, as defined by claim 1.

18. The method of claim 1, wherein the captured video included in the live game video stream is an unmodified captured video of the live studio.

19. A computerized method, performed by a player's device, for executing an interactive live game, the method comprising:
  receiving a selection of a player to participate in an interactive live game;
  sending, a request that pertains to the received selection; and
  repeatedly:
    obtaining from a first source of information a live game video stream comprising a captured video of a live studio and game display data that pertains to execution of the selected interactive live game, wherein the captured video includes video portions, each video portion being associated with a video timestamp;
    separately and a-synchronously from a second source of information other than the first source of information receiving modified game events generated in the executed interactive live game, the modified generated game events being associated with sync data comprising event timestamps indicative of the time that a game event of the games events was generated;
    synchronizing between a-synchronously received modified game events and the obtained live game video stream, based on the associated event timestamps in the received modified game events and the video timestamps in the obtained video, and creating a composited synchronous video comprising the obtained live game video stream and data that pertains to the received modified game events, wherein the composited synchronous video constitutes the interactive live game; and
    displaying the composited synchronous video, thereby enabling the player to participate in the interactive live game;
    wherein at least some of the events are generated in response to receiving data indicative of a player's action in the executed interactive game.

20. The computerized method of claim 19 for executing an interactive live game, the method comprising:
  receiving a player's action in the interactive live game;
  in response to transmitting data indicative of the player's action, receiving a respective generated game event.

21. A non-transitory computer readable storage medium tangibly embodying a program of instructions that, when executed by a computer, cause the computer to perform a method for executing an interactive live game, as defined by claim 19.

22. A gaming system for facilitating a player's device to execute interactive live games, the gaming system comprising:
  a game server configured to execute an interactive game, by generating game events, and associating the generated game events with sync data comprising event timestamps indicative of the time that a game event of the games events was generated, giving rise to modified game events; wherein at least some of the events are generated in response to receiving data indicative of a player's action in the executed interactive game;
  at least one camera positioned in a live studio configured to capture a video of a live studio and to live stream the captured video; wherein the captured video includes video portions, each video portion being associated with a video timestamp;
  a game renderer configured to receive data indicative of the executed interactive game from the game server, to determine game display data and to transmit the determined game display data;
  a video processor configured to receive the captured video from the at least one camera, receive the game display data from the game renderer, and to create a live game video stream;
  wherein the game server is configured to receive, from the player's device, a request of a player to participate in the interactive game, and to transmit to the player's device modified game events generated in the executed game;
  thereby facilitating the player's device, after obtaining from the video processor the live game video stream, to synchronize between the obtained video stream and modified game events separately and a-synchronously received from a source of information other than the video processor, based on the sync data in the modified game events and the video timestamps in the obtained video stream, and to create a composited synchronous video comprising the obtained live game video stream and data that pertains to the transmitted modified game events, wherein the composited synchronous video constitutes the interactive live game.

23. A computerized method for facilitating players' devices to execute an interactive game, the method comprising:
  receiving from the players' devices requests of a plurality of players to participate in an interactive random number generator (RNG) based game; and
  repeatedly:
    executing the interactive RNG based game, including generating game events;
    transmitting data indicative of the executed game and the generated game events to the players' devices, the data indicative of the executed game being obtained by the players' devices from a first source of information, the generated game events being separately and a-synchronously received by the players' devices from a second source of information other than the first source of information; and
    synchronizing between the generated game events and the data indicative of the executed game;
    wherein at least some of the events are generated in response to receiving data indicative of the players' actions in the executed interactive game.

24. The method of claim 23, wherein the RNG based game is slots game.

25. A non-transitory computer readable storage medium tangibly embodying a program of instructions that, when executed by a computer, cause the computer to perform a method for facilitating players' devices to execute an interactive live game as defined in claim 23.

26. The method of claim 23, wherein transmitting the data indicative of the executed game to the players' devices comprises:
- transmitting the data indicative of the executed game to a game renderer to determine game display data and to transmit the determined game display data to a video processor; and
- transmitting from the video processor to the players' devices a live game video stream created based on the game display data.

* * * * *